United States Patent [19]

Horn et al.

[11] Patent Number: 4,525,259

[45] Date of Patent: Jun. 25, 1985

[54] METHOD AND APPARATUS FOR ELECTRODIALYSIS

[75] Inventors: Richard E. Horn; Bradley D. Rodeheaver, both of Pittsburgh, Pa.

[73] Assignee: Electrochem International, Inc., McDonald, Pa.

[21] Appl. No.: 550,600

[22] Filed: Nov. 10, 1983

[51] Int. Cl.³ .................... B01D 13/02; G01N 27/28
[52] U.S. Cl. ................................. 204/182.4; 204/301
[58] Field of Search ........................... 204/180 P, 301

[56] References Cited

U.S. PATENT DOCUMENTS

| | | | |
|---|---|---|---|
| 2,777,811 | 1/1957 | McRae et al. | 204/301 |
| 2,860,095 | 11/1958 | Katz et al. | 204/301 |
| 3,165,460 | 1/1965 | Zang et al. | 204/301 |
| 3,179,583 | 4/1965 | Chen et al. | 204/301 |
| 3,203,887 | 8/1965 | Chen et al. | 204/180 P |
| 4,313,808 | 2/1982 | Idemoto et al. | 204/301 |
| 4,389,293 | 6/1983 | Mani et al. | 204/180 P |

*Primary Examiner*—John F. Niebling
*Assistant Examiner*—B. J. Boggs, Jr.
*Attorney, Agent, or Firm*—Stanley J. Price, Jr.

[57] ABSTRACT

The method and apparatus for rinsing an electrodialysis electrode provides isolation from the fluid being electrodialyzed. The method utilizes the natural circulation of the liquid and provides an exchange between the anode and cathode liquids while maintaining electrical isolation to thereby improve the efficiency of the electrodialysis cell and reducing the power requirements. The method of rinsing makes use of the gas generated at the electrodes to provide a motivating fluid for circulating the electrode rinse liquid. Circulation of the fluid is carried out in the slug flow region to provide electrical isolation. In the multi chamber apparatus the chamber adjacent to both of the electrode chambers contains the dilute liquid and is positioned between the electrode chamber and the chamber containing the concentrated solution to prevent migration of ions from the concentrated solution into the electrode chamber to contaminate the electrode.

11 Claims, 3 Drawing Figures

METHOD AND APPARATUS FOR ELECTRODIALYSIS

BACKGROUND OF THE INVENTION

1. Field of the Invention

This invention relates in general to a method and apparatus for electrodialysis, and more particularly, to a method and apparatus for rinsing an electrodialysis electrode by exchanging the anode and cathode fluids while maintaining electrical isolation.

2. Description of the Prior Art

Electrodialysis devices consist of a stack or group of cells containing alternating, concentrating and diluting chambers separated by ion exchange membranes. At either end of the stack there are provided electrode compartments; one compartment containing an anode and another compartment containing a cathode. The compartments or cells may be arranged either horizontally or vertically and generally take the form of a stack similar to a filter press. There are, however, cells of an open construction called unit cell construction.

Depending upon the concentration and chemical composition of the feed solution, the electrodes can be rinsed either with a portion of the feed solution or a portion of the concentrated solution thereby making use of the fluid pumps which provide the stack with the fluids to be treated. The pumps provide circulation for the fluids which rinse the two electrode compartments. This arrangement, while outwardly simple, has inherent problems. Such a system permits an electrically conductive path, other than through the device itself, to connect both electrode compartments. Although long passages of small cross sections are provided, this results in a leakage of current through the manifolds, which reduces the efficiency of the electrodialysis device. Sometimes acids or other chemicals are introduced into one or both of the electrical compartments to prevent unwanted reactions, such as scaling or precipitation or the formation of a corrosive gas.

It has also been known to isolate the anode and cathode compartments to prevent unwanted reactions, such as the deposition of metal or the oxidation of a product. By providing anode and cathode streams separate from the main body of fluid to be electrodialyzed, these reactions may be prevented. If the streams for the anode and cathode compartments are kept separate, then a base may be needed and can be added to the anode stream and if needed an acid added to the cathode stream to retain ion contact and prevent pH change. This was generally circumvented in the past by using a common reservoir for both the anode and cathode streams and utilizing a pump to convey the fluids to both the anode and cathode compartment from which it was returned to the reservoir and recirculated. In this manner, the ionic content of both the anode and cathode compartments remained constant. However, in this system, shunt current leaked through the fluid passages and circumvented the electrodialysis device causing an inefficiency in the device. In addition, pumping power was required to produce the circulation.

It has also been known, as for example in U.S. Pat. No. 3,179,583, to make use of the natural circulation caused by the gas generated in the electrode compartment to circulate this fluid. This patent, however, and U.S. Pat. No. 3,203,887 required the use of chemical addition in the form of solid material in a container or in the electrode compartment itself, which is consumed in the electrode process. In U.S. Pat. No. 3,179,583, the same fluid is circulated from the electrode chamber to the reservoir and returns from the reservoir to the chamber.

It has also been known to use polarity reversal in electrodialysis stacks to prevent fowling of membranes and scaling of membranes and electrodes. With current reversal in the past, one of the compartments adjacent the electrode compartment would contain a concentrated solution or liquid and could permit the diffusion of coions through the membrane to deposit on the electrodes or contaminate the electrode compartment.

SUMMARY OF THE INVENTION

The present invention eliminates the above-discussed problems in that the natural circulation from the anode and cathode compartments caused by the gas generated in the electrode compartments circulates the fluid to a compartmented reservoir having separate chambers, and the fluid from the anode chamber is then recirculated to the cathode chamber and the fluid from the cathode chamber is then recirculated to the anode chamber.

Utilizing different sizes of conduits or tubes from the anode and cathode chambers to the separate compartments of the reservoir and to return the fluid to the respective anode and cathode compartments provides a selected rate of flow. Further, the height of the fluid outlet from the anode and cathode compartments into the compartmented reservoirs also regulates the flow of anolyte and catholyte to the respective anode and cathode compartments.

In a multi-compartment electrodialytic cell the end compartments are electrode compartments and the compartments adjacent to both of the electrode compartments contain the dilute liquid. One of these dilute compartments acts as a diluting compartment; the other as an idling compartment. The compartments adjacent these compartments are alternating concentrating and diluting compartments forming the rest of the electrodialytic cell.

DESCRIPTION OF THE PREFERRED EMBODIMENTS

Figure 1:
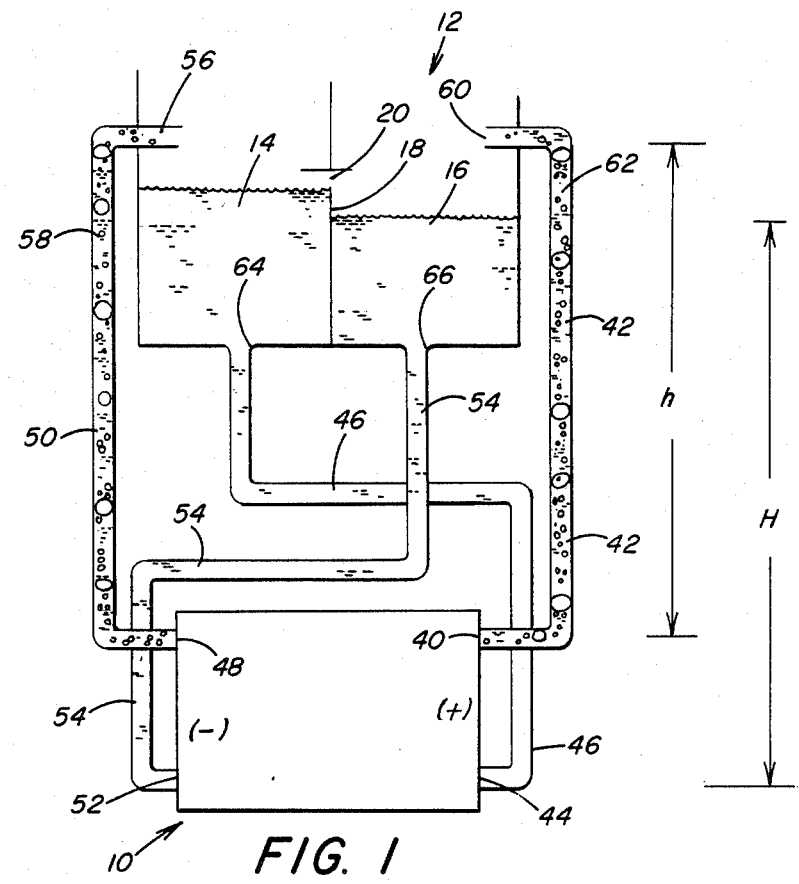
FIG. 1 is a schematic illustration of electrodialysis apparatus with the anode and cathode cells connected to a compartmented reservoir by means of suitably sized conduits.
Figure 2:
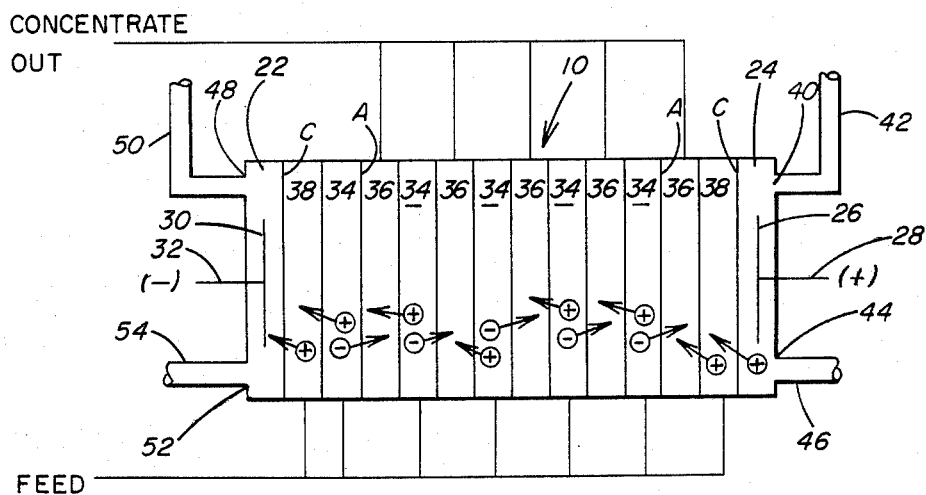
FIG. 2 is a schematic illustration of a stack of electrodialysis cells in an embodiment of the electrodialysis device showing a cell arrangement with current reversal and also schematically illustrating an arrangement for feed solution input and concentrated solution output.

Referring to the drawings, there is illustrated in FIG. 1 an electrodialysis stack generally designated by the numeral 10. FIG. 2 illustrates the electrodialysis stack in detail and omits the means for supplying the fluids to the concentrating compartments and the diluting compartments. Such means for supplying fluid to these respective compartments was well-known in the art, as is illustrated in U.S. Pat. No. 3,179,583.

Positioned above the electrodialysis stack 10 is a reservoir generally designated by the numeral 12 that includes a first compartment 14 and a second compartment 16 with a suitable divider 18 therebetween. Although the reservoir 12 is illustrated as a unitary device with compartments 14 and 16 therein, it should be understood that separate reservoirs can be utilized to receive the fluids from the anode and cathode compartments.

There is provided an opening 20 in the divider 18 between compartments 14 and 16 to permit fluid to flow as illustrated.

FIG. 2 illustrates an electrodialysis stack arrangement suitable for reverse current operation where the electrode rinse solution contains a common cation with the solution to be electrodialyzed. With this arrangement, the electrode chambers 22 and 24 are bounded by cationic membranes designated by the letter "C". The cationic membrane is a membrane which passes cations therethrough and excludes anions. Anionic membranes, i.e., membranes that pass anions and exclude cations are designated by the letter "A". In the arrangement shown, the compartment 24 is an anode compartment with an anode 26 positioned therein with a wire 28 connected to positive current. The cathode compartment 22 has a cathode 30 positioned therein, which is connected by wire 32 to the negative current.

With the anode compartment 24 on the right-hand side and the cathode compartment 22 on the left-hand side of the stack, as illustrated in FIG. 2, the areas or compartments 34 are diluting compartments and the compartments 36 are concentrating compartments. The compartments 38 adjacent the anode and cathode compartments 22 and 24 always contain dilute solutions and may also be considered dilute compartments, although no dilution is accomplished in these compartments.

FIG. 2 also illustrates, diagrammatically, the cations being removed from the anode compartment and passing into compartment 38 and the cations being removed from compartment 38 and flowing into the cathode compartment 22, thus, maintaining an ionic balance in the electrode compartments. As previously stated, conduits for supplying fluid to the diluting and concentrating compartments are well known in the art and are not illustrated. The anode compartment 24 has an outlet 40 adjacent its upper portion to which is connected an outlet conduit 42. In anode compartment 24, there is a second opening 44 and a return conduit 46 is connected thereto. Similarly, the cathode compartment 22 has an upper opening 48 and an outlet conduit 50 is connected thereto. The cathode compartment 22 has an inlet opening 52 with an inlet conduit 54 connected thereto.

Referring to FIG. 1, the cathode outlet conduit 50 extends upwardly from the stack 10 to a location above the liquid level of reservoir 12 and has an outlet opening 56 which permits the fluid from the cathode compartment 22 to flow upwardly by means of the gas generated in the cathode compartment to serve as the propelling means. The gas is schematically designated in conduit 50 by the numeral 58.

Similarly, the outlet conduit 42 from the anode compartment 24 extends upwardly and has an outlet 60 positioned above the liquid level of reservoir 12. Again, the fluid from the anode compartment 24 is conveyed by the gas generated in the anode compartment as illustrated by the numeral 62.

The compartment 14 in reservoir 12 which receives the fluid from the cathode compartment 22 has an outlet opening 64 which is connected to the conduit 46. The conduit 46, as previously discussed, is connected to inlet opening 44 of the anode compartment 24. The reservoir compartment 16 that receives the fluid from the anode compartment has an outlet opening 66 which is connected to conduit 54. The other end of conduit 54 is connected to the inlet opening 52 of the cathode compartment 22. With this arrangement, the fluid from the cathode compartment 22 is circulated to the compartment 14 of the rinse reservoir 12 by means of conduit 50 and the fluid from the cathode compartment 22 in the reservoir compartment 14 is then conveyed by means of conduit 46 to the anode compartment 24. Similarly, the fluid from the anode compartment 24 is conveyed to the rinse reservoir compartment 16 and from the rinse reservoir compartment 16 through conduit 54 to the cathode compartment 22.

Figure 3:
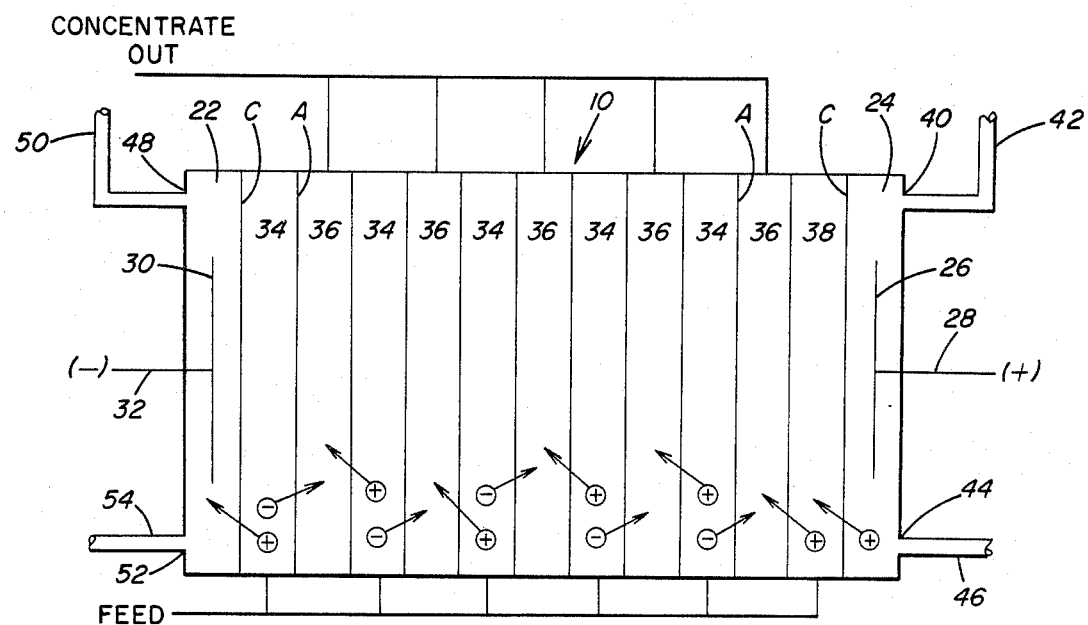
FIG. 3 is a schematic illustration of a stack of electrodialysis cells in another embodiment of the electrodialysis device showing a cell arrangement without current reversal and also schematically illustrating an arrangement for feed solution input and concentrated solution output.

With this arrangement, the current may be reversed making the anode compartment 24 the cathode compartment, and the cathode compartment 22 the anode compartment. In this instance, the compartments 34 would be concentrating compartments and the compartments 36 diluting compartments. Dilute idling compartment 38 remain the same and cations would leave the anode compartment into this idling compartment 38 and from the dilute idling compartment 38 into the reversed cathode 24. In this manner, even with current reversal, a concentrated solution is never against an electrode compartment and any materials which might deposit or cause problems with the electrodes will be excluded by Donnan exclusion from entering these electrode compartments. In a system where current reversal is not used, one of the dilute idling compartments 38 may be eliminated. In FIG. 3, the compartment 38 adjacent the cathode compartment 22 has been eliminated and would then be a diluting compartment 34. In a system where the common ion is a anion, the idling compartment 38 would be bounded by two anion membranes. In this situation, then the dilute idling compartment on the anode side adjacent the anode 24 could be eliminated as the compartment next to the anode compartment would then be a diluting compartment.

As will be apparent from the above description, there is provided a vertically oriented electrodialysis stack in which a plurality of diluting and concentrating compartments are placed, bounded on either end by an electrode compartment. There is an anode compartment on one side and a cathode compartment on the other, whereby, the fluid in the anode and cathode compartments is the same and the electrode solution has at least one common ion with the fluid being treated in the electrodialysis device.

The fluid is contained in the two-compartment reservoir that is constructed in such a manner as to allow natural circulation of the anode and cathode streams by means of the motive force generated by the difference in specific gravity of the fluids created by the generation of gases within the anode and cathode compartments. The conduits 42 and 50 carrying the solution gas mixture are of such size and positioned in such a manner that the gas bubbles fill the conduits in such a manner that fluid does not substantially slip around the gas bubbles thereby utilizing the gas bubbles to propel the fluid into the reservoir and substantially causing an electrical isolation.

The fluid which feeds the cathode compartment is discharged into the reservoir compartment 14 which, in turn, feeds the anode compartment 24 and the fluid which feeds the anode compartment is discharged into the reservoir compartment which feeds the cathode compartment. The fluid is discharged from the respective conduits in such a manner as to provide electrical insulation, for example, by use of a discharge tube unwetted by the solution being used. This tube is constructed of material which is not electrically conductive such as polyethylene, polypropylene, or TEFLON ® and the like. The discharge is accomplished in such a manner as to provide insulation, for example, by being discharged a small distance above the level of the fluid in the reservoir.

The two compartments 14 and 16 of the reservoir may be connected together in such a manner, as for example opening 20, to provide flow from one to the other without electrical contact. This may be necessary if the circulation rate in one electrode compartment is greater than that in the other electrode compartment. For example, hydrogen is generated in the cathode compartment and oxygen is generated in the anode compartment, the hydrogen volume being twice that of the oxygen volume would cause a circulation from the cathode compartment at twice the rate as that in the anode compartment thereby causing an imbalance in the solution levels. Both electrode compartments are provided with semi-permeable membranes, allowing electrical conductivity while isolating them from the electrodialysis stack chemically. These membranes, in both cases, may be of the same type; that is, both anionic or both cationic although they need not necessarily be the same membrane.

The dilute idling compartment is positioned adjacent to both electrode compartments. This is particularly desirable if the solution is to be concentrated to any great degree and that it contains an ion that might be detrimental to the electrode rinse system.

Ion exchange membranes are not 100% selective, particularly, in concentrated solutions where the Donnan exclusion is overcome, allowing the diffusion of coions through the membrane at significant rates. The selection of membranes is dependent upon which common ion is used in the electrode rinse system. For example, if the common ion selected is sodium, that is if the solution contained sodium ions, and it was desirable to use sodium hydroxide as the electrode rinse system solution, cation membranes would be provided at both the anode and cathode. In this manner, sodium ions would be discharged into the fluid being treated from the anode and recovered from the fluid by the cathode thereby maintaining the ionic content of the electrode rinse system.

Conversely, if sulfate ion where the common ion selected and sulfuric acid was provided as the electric rinse system, anionic membranes would be provided for both compartments and sulfate ion would be discharged into the solution from the cathode stream and recovered from the solution by the anode stream. This system may also be used when current reversal is used in the electrodialysis stack. In this instance, it may not be necessary to provide communication between the two reservoir compartments, as reversal of current could occur at intervals where is it unnecessary to flow from one compartment to the other, in fact, the level of the solution in these reservoirs could be used to initiate the current reversal process by providing a level activated switch to reverse the current.

The following examples are exemplary of the advantageous features of the method and apparatus for rinsing an electrodialysis electrode. In FIG. 1, the height of the solution outlet level is indicated by "h" and the height of the fluid level above the entrance of the liquid level is indicated by "H".

EXAMPLE I

A forty cell pair electrodialysis stack, contained 1.5 sq. ft. per cell and operated at 20 amps or 13.33 amps per sq. ft. The stack was arranged to electrodialyze a solution of potassium hydroxide. Potassium hydroxide was also placed in both electrode compartments which were connected to a common reservoir.

Concentrations of Potassium Hydroxide in the Compartments or Cells

Dilute—3.93 g/l
Concentrated—83.59 g/l
Electrode—83.59 g/l

When operating at this current density, the voltage recorded on the unit was 44 volts. The reservoir was removed and replaced with a divided reservoir, similar to that shown in FIG. 1. The unit was again turned on and the voltage recorded. With the current set at 20 amps, the voltage recorded was 52 volts. This shows an 18% decrease in shunt current.

EXAMPLE II

Example II. A cell was set up as in Example I. Conditions were the same as in Example I. Two different size tubings were used; $\frac{3}{8}''$ and $\frac{1}{4}''$ and three different heights were used for the height of the solution outlet level above the outlet from the cell. This is shown as "h" and the height of the liquid level above the entrance to the cell as "H" in FIG. 1.

The results are shown in the table below, with flow for anolyte and catholyte in ml per minute. After two hours of operation, the outlet from the anolyte and catholyte were analyzed. The outlet at the anolyte showed a solution concentration of 83.40 g/l KOH, and the outlet from the catholyte showed 83.90 g/l KOH.

TABLE

| Tube Size | h in | H in | Anolyte ml/min | Catholyte ml/min |
|---|---|---|---|---|
| .375 | 9.5 | 15 | 78.6 | 96 |
| .375 | 14 | 19.5 | 85 | 109 |
| .375 | 18.5 | 24 | 95 | 130 |
| .250 | 9.5 | 15 | 44.6 | 118 |
| .250 | 14 | 19.5 | 82 | 129 |
| .250 | 18.5 | 24 | 106 | 195 |

According to the provisions of the Patent Statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A method of electrodialysis in electrodialysis apparatus having ion selective permeable membranes defining a stack of chambers including concentrating chambers containing a concentrate liquid and diluting chambers containing a dilute liquid, said diluting chambers positioned between said concentrating chambers, a pair of electrode compartments including a cathode chamber positioned at one end of said stack with a cathode positioned therein and an anode chamber positioned at the other end of said stack with an anode positioned therein, and a direct current source connected to said electrodes which includes, maintaining a dilute liquid in a pair of chambers adjacent to said pair of electrode chambers to prevent ion migration from the concentrate liquid in said concentrating chambers into said electrode chambers, one of said chambers being a diluting chamber and the other of said chambers being an idling chamber, said idling chamber containing a dilute solution and having a membrane of the same ion permselective type on the side away from the electrode compartment as on the side of said electrode compartment, circulating liquid from said cathode chamber to a first reservoir and from said first reservoir to said anode chamber, circulating liquid from said anode chamber to a second reservoir and from said second reservoir to said cathode chamber, and maintaining electrical isolation between said reservoirs and said anode and cathode chambers while recirculating liquid between said anode and cathode chambers.

2. A method for rinsing an electrodialysis electrode in electrodialysis apparatus having an anode chamber and a cathode chamber comprising, circulating a liquid from a cathode chamber to a receiver and from said receiver to an anode chamber, and circulating liquid from an anode chamber to a second receiver and from said second receiver to a cathode chamber in such a manner as to maintain electrical isolation between said receivers and said anode and cathode chambers while recirculating liquid between said anode and cathode chambers.

3. A method for rinsing an electrodialysis electrode as set forth in claim 2 which includes, utilizing the gas generated in at least one of said chambers to convey the liquid to the respective receiver.

4. A method for rinsing an electrodialysis electrode as set forth in claim 2 which includes, transferring a portion of said liquid from one of said receivers to the other of said receivers while electrically isolating said liquids from each other.

5. Electrodialysis apparatus comprising ion selective permeable membranes defining a stack of adjacent chambers which include concentrating chambers containing a concentrate liquid and diluting chambers containing a dilute liquid, said diluting chambers positioned between said concentrating chambers, a pair of electrode chambers including a cathode chamber positioned at one end of said stack with a cathode positioned therein, and an anode chamber positioned at the other end of said stack with an anode positioned therein, a direct current source connected to said electrodes, a chamber positioned between each of said electrode chambers and the adjacent concentrating chamber, said chamber containing dilute solution to prevent undesirable ion migration from the concentrating chamber into the adjacent electrode chamber, a first reservoir, conduit means to circulate liquid from said cathode chamber to said first reservoir and from said first reservoir to said anode chamber, and conduit means to circulate liquid from said anode chamber to a second reservoir and from said second reservoir to said cathode chamber thereby maintaining electrical isolation between said reservoirs and said anode and cathode chambers while recirculating liquid between said anode and cathode chambers.

6. Electrodialysis apparatus as set forth in claim 5 which includes, a pair of idling chambers containing dilute solution bonded on both sides by the same type of membrane and positioned adjacent to said pair of electrode chambers thereby allowing current reversal while preventing undesirable ion migration into said electrode chambers.

7. Electrodialysis apparatus comprising ion selective permeable membranes defining a stack of adjacent chambers which include, concentrating chambers containing a concentrate liquid and diluting chambers containing a dilute liquid, said diluting chambers positioned between said concentrating chambers, a pair of electrode chambers including a cathode chamber positioned at one end of said stack with a cathode positioned therein, an anode chamber positioned at the other end of said stack with an anode positioned therein, a direct current source connected to said electrodes, a divided reservoir having a first compartment and a second compartment, conduit means to circulate liquid from said cathode chamber to said reservoir first compartment and from said reservoir first compartment to said anode chamber, and conduit means to circulate liquid from said anode chamber to said reservoir second compartment and from said reservoir second compartment to said cathode chamber thereby maintaining electrical isolation between said reservoir compartments and the anode and cathode chambers while recirculating liquid between said anode and cathode chambers.

8. Electrodialysis apparatus as set forth in claim 7 in which said reservoir includes, a first conduit connecting said cathode chamber with said first compartment and a second conduit connecting said first compartment with said anode chamber.

9. Electrodialysis apparatus as set forth in claim 8 which includes, a third conduit connecting said anode chamber with said second compartment and, a fourth conduit connecting said second compartment with said cathode chamber.

10. Electrodialysis apparatus as set forth in claim 7 which includes, conduit means having a size suitable to permit bubbles of gas generated in at least one of said electrode compartments to convey the liquid from said electrode compartment to said reservoir.

11. Electrodialysis apparatus as set forth in claim 7 in which said reservoir includes, a first compartment and a second compartment with a divider therebetween, an opening in said divider to permit liquid to flow from one compartment to the other compartment in such a manner as to maintain electrical isolation between said compartments.

\* \* \* \* \*